United States Patent
Lopez Martinez et al.

(10) Patent No.: US 7,666,315 B2
(45) Date of Patent: Feb. 23, 2010

(54) METHODS, DEVICES AND REAGENTS FOR WASTEWATER TREATMENT

(75) Inventors: Jose M. Lopez Martinez, Barcelona (ES); Fernando Puente de Vera, Zaragoza (ES); Luis Monreal Munoz, Zaragoza (ES); Pasqual Vall Escala, Barcelona (ES)

(73) Assignee: FMC Foret S.A. (ES)

( * ) Notice: Subject to any disclaimer, the term of this patent is extended or adjusted under 35 U.S.C. 154(b) by 274 days.

(21) Appl. No.: 10/568,994

(22) PCT Filed: Aug. 22, 2003

(86) PCT No.: PCT/ES03/00433
§ 371 (c)(1), (2), (4) Date: Apr. 10, 2007

(87) PCT Pub. No.: WO2005/019118
PCT Pub. Date: Mar. 3, 2005

(65) Prior Publication Data
US 2008/0035583 A1    Feb. 14, 2008

(51) Int. Cl.
C02F 1/72 (2006.01)
C02F 1/68 (2006.01)
C02F 1/78 (2006.01)

(52) U.S. Cl. .............. 210/759; 210/763; 210/749; 210/760

(58) Field of Classification Search .......... 210/759, 210/763, 748, 760, 762
See application file for complete search history.

(56) References Cited

U.S. PATENT DOCUMENTS

| | | | |
|---|---|---|---|
| 4,280,914 A | 7/1981 | Knorre | |
| 4,693,833 A * | 9/1987 | Toshikuni et al. | 210/759 |
| 4,770,773 A | 9/1988 | Pahmeier | |
| 4,877,558 A * | 10/1989 | Morioka et al. | 588/18 |
| 5,060,167 A | 10/1991 | Ticcioni | |
| 5,351,199 A | 9/1994 | Ticcioni | |
| 5,741,427 A * | 4/1998 | Watts et al. | 210/747 |
| 6,139,755 A * | 10/2000 | Marte et al. | 210/752 |
| 6,576,144 B1 * | 6/2003 | Vineyard | 210/758 |

FOREIGN PATENT DOCUMENTS

| | | |
|---|---|---|
| DE | 4314521 A1 * | 11/1994 |
| EP | 1 157 972 A1 | 11/2001 |
| WO | WO 99 21801 A1 | 5/1999 |
| WO | WO 02 04360 A1 | 1/2002 |

OTHER PUBLICATIONS

"Fenton's Reagent—Iron Catalyzed Hydrogen Peroxide", Aug. 3, 2002, USPeroxide, http://www.h2o2.com/.*
"Stainless Steel—Grade 904L", May 21, 2003, AZo Journal of Materials Online, http://www.azom.com/.*
Walling, C. "Fenton's Reagent Revisited", Presented at the American Chemical Society in Los Angeles Apr. 1971. Professor: Department of Chemistry, University of Utah, Salt Lake City, Utah, USA.

* cited by examiner

*Primary Examiner*—Duane Smith
*Assistant Examiner*—Paul J. Durand

(57) ABSTRACT

The invention relates to a method, devices and reagents which are used for Fenton reaction-based wastewater treatment. According to the invention, the oxidation reaction of the organic material with the oxygenated water is performed in the main oxidation reactor (12) in the presence of metallic catalysts. The Fenton reaction takes place in the reactor at absolute pressure of between 1 Kg/cm² and 1.5 Kg/cm² and at a temperature of between 110° C. and 120° C. Once treated and cooled, the effluent is conveyed to zone D to a neutralising tank (6) in which the pH is increased to a value greater than seven, thereby causing precipitation of the hydroxides. In addition, safety checks are carried out automatically.

14 Claims, 1 Drawing Sheet

METHODS, DEVICES AND REAGENTS FOR WASTEWATER TREATMENT

SUBJECT MATTER OF THE INVENTION

This invention relates to a method, devices and reagents for wastewater purification via which the oxidation reaction of organic contaminants in the wastewater is optimized by means of the Fenton reaction.

The purpose of the treatment is to reduce the Chemical Oxygen Demand (COD) of the effluents, thereby increasing biodegradability.

The method is characterized by complete automation under safe conditions.

The method is also characterized by the fact that the Fenton reaction that occurs in the reactor is optimized to a certain temperature and pressure and with a catalyst prepared specifically to increase the efficiency of the method and at the same time minimize pollution and precipitation.

BACKGROUND OF THE INVENTION

This invention relates to a method, devices and reagents for Fenton reaction-based wastewater purification.

Despite the significant advances in the search for greater efficiency and productivity of the chemical processes involved in biodegradability, the treatment of industrial effluents containing organic contaminants remains a serious problem to be solved.

There is great concern in the search for economic alternatives that permit effective degradation of the organic load and its toxicity. A particularly important alternative is chemical treatment with agents that transform organic contaminants into harmless compounds, carbon dioxide and water by means of an oxidation process.

In 1894, Fenton discovered the oxidation of organic molecules in an aqueous solution by the simultaneous addition of a water-soluble iron catalyst and hydrogen peroxide (Walling C., "Fenton's Reagent Revisited," Accounts of Chemical Research, Vol. 8, No. 5. 125-131 (1977)).

The Fenton reaction (hydrogen peroxide in the presence of iron salts) consists of the oxidation of the organic matter contained in effluents using hydroxyl radicals resulting from the controlled decomposition of the peroxygenated water as an oxidizing agent. The iron acts as a hydrogen peroxide activator, generating hydroxyl radicals with an oxidation potential greater than that of permanganate.

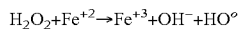

The Fenton reaction degrades the organic matter into increasingly simpler compounds until reaching the final formation of $CO_2$ and $H_2O$.

The global reaction is as follows:

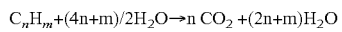

The stoichiometric consumption of the $H_2O$ depends on the oxidation of the organic materials, which defines the chemical oxygen demand (COD). The presence of free $H_2O_2$ and chlorides in the effluent interferes with the COD analysis, which makes it advisable to use the TOC (Total Organic Carbon) as the control analysis.

Patent documents describe wastewater purification via treatment with Fenton reagent, such as, for example, European publication number EP0022525, which defines a process for decreasing the chemical oxygen demand of effluents by treating them with oxygenated water in the presence of a transition metal.

The Japanese patent with publication number JP56113400 defines a wastewater treatment that decomposes the organic matter by adding iron salts and oxygenated water and heating to 50° C.-70° C. for more than 60 minutes. It is subsequently treated, under agitation, with an anionic exchange resin that adsorbs the decomposed substances.

Document DE4314521 describes a process for continuous or discontinuous operations for purifying industrial wastewater contaminated with organic matter by means of the addition of hydrogen peroxide and a homogenous catalyst, preferably Fenton reagent. The reaction is carried out at 35° C.-40° C.

The method, devices, and purification reagents of this invention optimize the oxidation of organic contaminants in wastewater under conditions advantageous for the treatment of flows that may be elevated.

DESCRIPTION OF THE INVENTION

This invention relates to a method, devices and reagents for wastewater purification.

The installation consists of four zones that are identified with four stages, which throughout the specification we will differentiate using letters: zone A, effluent preparation; zone B, reagent preparation; zone C, reaction; zone D, neutralization and filtration.

In zone A, the effluent is collected and homogenized via agitation or recirculation, the pH is adjusted, and using two heat exchangers the temperature is increased until the desired temperature in the reactor is reached.

In the first effluent-effluent heat exchanger, using an economizer system the temperature of the effluent is increased without treating it, at the same time as the temperature of the effluent that exits the reactor and is conveyed to the neutralizing tank decreases.

In zone B the reagents are prepared: 35% hydrogen peroxide and the catalyst prepared specifically to optimize the oxidation process, composed of metal salts, organic acid, and a complexing agent, which are added to the effluent from zone A in the reactor feed line. The acidifying agent is added to the homogenization tank and the alkalizing agent to the neutralization tank to reach the desired pH.

The reactor is located in zone C. The hydrogen peroxide and the catalyst from zone B and effluent from zone A enter the reactor through the feed line.

The oxidation reaction of the organic matter with the peroxygenated water takes place in the reactor in the presence of metallic catalysts.

The Fenton reaction takes place in the reactor at an absolute pressure of between 1 Kg/cm² and 1.5 Kg/cm² and at a temperature of between 110° C. and 120° C.

Once treated and cooled, the effluent is conveyed to zone D to a neutralization tank in which the pH is increased above seven, thereby causing precipitation of hydroxides.

A pump sends the water from the neutralization tank to a filter or subsequent decanter, separating the solid waste from the treated effluent.

The safety checks are carried out automatically.

Throughout the method the components and conditions are selected so as to not adversely affect the reactor operation or exceed the reactor's physical limitations. During the method, all variables that affect safety are measured continuously and there are pre-shutdown and emergency shutdown alarms.

DESCRIPTION OF THE DRAWINGS

This specification includes a set of plans illustrative of the preferred example of the invention, but is not intended to be limitative.

PREFERRED EMBODIMENT OF THE INVENTION

Figure 1:
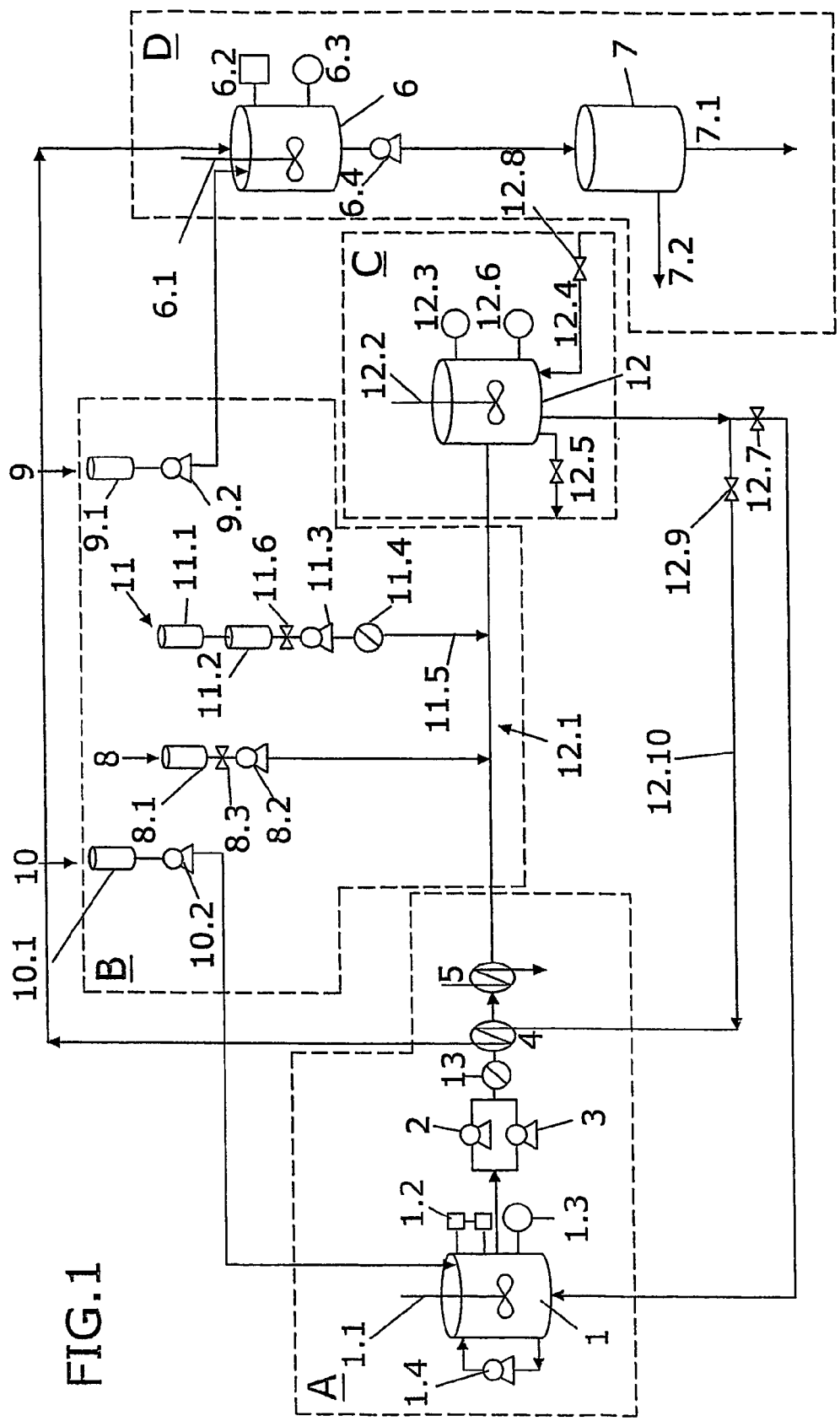
FIG. 1 shows a diagram of the method.

This invention relates to a method for purifying wastewater. FIG. 1 shows a diagram of the method, devices, and reagents required to treat wastewater by means of a Fenton reaction under special conditions while maintaining safe conditions at all times.

The method is divided into four stages: A, effluent preparation; B, reagent preparation; C, reaction; D, neutralization and filtration, which correspond to four zones A, B, C, and D distinguished in the installation.

Description of the Installation and Devices:

The installation has four different zones.

Zone A—Effluent Preparation.

This is the effluent collection zone in the homogenization tank (1) where homogenization takes place by means of an agitator (1.1) or by recirculation using a pump (1.4).

The first pH adjustment to a range of 2-5 takes place in the homogenization tank (1) by adding acidifying agent from the acidifying agent storage tank (10.1). The pH is checked by means of a bypass (1.2) that connects two pH meters that are continuously performing comparisons so that the pH check is redundant.

The volume of the homogenization tank (1) must be greater than three times the volume of the main oxidation reactor (12), which will be mentioned below, given the possibility of an evacuation of the reactor, for which reason it has the homogenization tank (1) with a level indicator (1.3).

At the outlet of the homogenization tank there are duplicate pumps (2, 3) that collect the effluent from the homogenization tank (1) and convey it to the main oxidation reactor (12) to be treated. After the pumps there is a flowmeter (13) that measures the flow rate.

Before the effluent gets to the main oxidation reactor (12) it must reach the reaction temperature, which must be in the 110° C. to 120° C. range. The economizer (4) causes a first temperature increase to 85° C. in the waters to be treated due to the heat exchange with the treated effluent from the main oxidation reactor (12), which is 115° C. The temperature of this effluent is in turn decreased to 45° C. before reaching the neutralization tank (6).

A second water vapor or oil vapor heat exchanger (5) raises the effluent temperature until the desired temperature is reached in the main oxidation reactor (12), which must be in the 110° C. to 120° C. range, preferably 115° C.

The construction materials of the exchangers (4 and 5) are selected from among stainless steel 904, graphite, titanium-palladium, hastelloy and inconel.

Zone B—Reagent Preparation.

In this zone are: an area (8) for preparing $H_2O_2$ that includes a 35% $H_2O_2$ storage tank (8.1), an $H_2O_2$ supply control valve (8.3), an $H_2O_2$ dosing pump (8.2) that limits the $H_2O_2$ flow to a maximum of 10% of the work flow of the purification plant; the alkalizing agent area (9), which includes an alkalizing agent storage tank (9.1) and a dosing pump for this alkalizing agent (9.2); the acidifying agent (10), which includes an acidifying agent storage tank (10.1) and a dosing pump for this acidifying agent (10.2); and the catalyst preparation area (11), which includes a polyethylene tank (11.1) for the preparation of the catalyst solution, a tank (11.2) for the dosing of the catalyst solution, and a dosing pump (11.3) for the catalyst solution composed primarily of metallic salts. The composition of the catalyst will be specified below.

In the catalyst dosing line (11.5) there is a flowmeter (11.4) that causes a preliminary shutdown and an alarm if the catalyst solution does not enter the main oxidation reactor (12).

The $H_2O_2$ and catalyst impulsion pumps (8.2, 11.3) direct the doses to the feed line (12.1) of the main oxidation reactor (12). The alkalizing agent pump (9.2) directs the dosing to the neutralization tank (6), and the acidifying agent pump (10.2) directs the dosing to the homogenization tank (1).

Zone C—Reaction.

The main oxidation reactor (12) must ensure that the reagents remain in the reactor for a sufficient period of time, and for this purpose it has a level control (12.3) that regulates the valve (12.9) located in the outgoing line (12.10). The residence time in the main oxidation reactor (12) is sixty minutes.

The main oxidation reactor (12) has a pressure control (12.6) that releases the gases and vapor generated to a bubbler.

The main oxidation reactor (12) has a water vapor or nitrogen vapor line (12.4) that according to an established sequence purges the main oxidation reactor (12) to prevent the formation of explosive mixtures and avoid the risks of inflammation. The nitrogen or vapor entry is controlled by an inerting valve (12.8).

The main oxidation reactor (12) has an automatic exhaust valve (12.7) that in the event of an emergency opens and empties [the contents of] the main oxidation reactor (12) into the homogenization tank (1).

The main oxidation reactor (12) has a valve (12.9) to control the level of the main oxidation reactor (12).

The construction material of the main oxidation reactor (12) may be stainless steel 904 or carbon steel enameled on the inside or carbon steel coated with Teflon on the inside.

Water lines at a temperature greater than 60° C. are coated with Teflon on the inside or are made of stainless steel 904 or titanium-palladium.

The main oxidation reactor (12) has an agitator (12.2) that starts automatically when the level inside the reactor exceeds 30%. If the agitator (12.2) of the main oxidation reactor (12) is stopped, the method cannot function.

The effluent exits the main oxidation reactor (12) through an outgoing line (12.10) that directs the effluent to the economizer (4). The main oxidation reactor (12) level is controlled by a PID interlock that regulates a valve (12.9) for this purpose.

Zone D—Neutralization and Filtration.

Once treated and cooled, the effluent is conveyed to the neutralization tank (6) with an agitator (6.1).

In this tank the pH is increased above 7 by means of the addition of NaOH or another alkalizing agent from the alkalizing agent storage tank (9.1), causing the precipitation of metallic hydroxides. The neutralization tank (6) has a pH controller (6.2) and a level controller (6.3).

A pump (6.4) sends the waters from the neutralization tank (6) to a candle filter (7). After the candle filter (7) there is an outgoing line (7.2) for the effluent and another outgoing line (7.1) for the collection of waste.

The effluent and solid waste can also be separated in a lamellar or static decanter or by means of bag filtration.

The effluent treatment limit characteristics are:

| | |
|---|---|
| pH | immaterial |
| Flow, m³/h | 100 L/h up to 100 m³/h |
| Sodium sulfate, g/L | maximum 40 g/L |
| Sodium chloride, g/L | maximum 200 g/L |
| TOC, g/L | maximum 15 g/L |
| COD, g/L | maximum 40 g/L |
| $H_2O_2$ | maximum 40 g/L |
| Solids in suspension | maximum 500 g/L |

For effluents whose organic matter concentration exceeds the COD value of 40 g/L, dilution in the homogenization tank will be provided for.

Startup.

The first step of the method is the startup of the system, for which the different transient conditions must be kept in mind until all of the devices reach regime conditions.

During startup a series of parameters are evaluated to confirm that they are within the working ranges. During this phase the effluent is recirculating to the homogenization tank (1) since there is no treatment. The pH must be in the working range, 3-4, and control is initiated of a series of parameters; if they are out of range startup is not authorized. There are also checks of the emergency shutdown parameters and automatic checks of the method.

The alarms that prevent startup are the levels of the different tanks and reservoirs, and the pH values of the different points of the method;

Homogenization tank, high level—60%
Homogenization tank, low level—20%
Neutralization tank, high level—50%
Neutralization tank, low level—10%
Homogenization adjustment, high pH—5.0
Homogenization adjustment, low pH—2.0
Neutralization tank, high pH—9.0
Neutralization tank, low pH—7.0

Parameters of Interest for the Check of the Purification Method:

The emergency shutdown parameters, total shutdown of the installation are: high temperature in the main oxidation reactor (temperature above 125° C.), high pressure in the main oxidation reactor (pressure above 1.5 Kg/cm$^2$), and exceeding the maximum preliminary shutdown time, 600 seconds.

Automatic sequence parameters that are activated during startup: PID (Proportional Integral-Derivative) homogenizer pH control, 3.0 (regulates acid dosing), PID temperature inside the reactor, 115° C., regulates heating through the exchanger 5, PID reactor level (100%), regulates the opening of the valve 12.9, PID reactor pressure, 1.0 bar, regulates the opening of the valve 12.5.

Purge temperature during startup above 50° C., startup authorization temperature 105° C., in-process purge temperature below 110° C., low reactor pressure during plant shutdown 60° C., low reactor level 30%.

The reactor agitator (12.2) does not start up at a level below 30%, preventing the main oxidation reactor (12) from operating at a lower level. When the temperature of the effluent in the main oxidation reactor (12) exceeds 50° C., the interlock control computer program opens the inerting valve, the nitrogen or water vapor purge valve, and the inerting continues until a temperature of 110° C. is reached.

When the startup authorization temperature (105° C.) has been reached, the plant may begin purification. For this the method must be authorized. The dosing of reagents, catalysts, and oxygenated water in the main oxidation reactor (12) feed line (12.1) is initiated. After thirty minutes they are permitted to recirculate to the homogenization tank (1) and the treated effluent is sent to the neutralization tank (6).

After successfully completing the "Startup" operation, the plant will remain in "Plant Running" mode. When startup is authorized, a series of emergency pre-shutdown alarms are activated. They are:

Low reactor temperature, 100° C.
Catalyst dosing interrupted
High pH, 5.0, in the homogenization tank
Low pH, 2.0, in the homogenization tank
Difference in measurements between 2 pH meters
Maximum reactor level, 95%
High reactor level, 90%
Low reactor level, 30%
Low or no effluent flow
Low effluent:$H_2O_2$ ratio, less than 8 with an $H_2O_2$ concentration above 4.4%
Reactor agitator stopped When the effluent temperature exceeds 110° C., the program closes the inerting valve (12.8). As of this temperature, the vapors generated in the effluent inert the reactors. If the temperature is below 110° C., the inerting is reinitiated. If the temperature is below 100° C., the preliminary shutdown alarm is activated due to low temperature in the main reactor (12).

Permanent Phase:

Although each of the stages are repeated in this subsection, this description of the permanent phase will describe the different variables and compositions that are involved in the purification method.

In the permanent or "Plant Running" phase, the effluent is homogenized in the homogenization tank (1) and there is a first pH adjustment and check by means of a bypass (1.2) in the 2-5 range.

The temperature of the effluent increases in the heat exchangers (4 and 5) until a range of 110° C.-120° C., preferably 115° C., is reached, and before entering the main oxidation reactor (12) it is mixed with the peroxygenated water and catalyst in the main oxidation reactor (12) feed line (12.1).

The effluent, along with the catalyst and peroxygenated water, enters the main oxidation reactor (12), and the reaction occurs in continuous mode using an agitator (12.2).

The oxidation reaction of the organic matter with the peroxygenated water takes place in the main oxidation reactor (12) in the presence of metallic catalysts. If the effluent does not enter the main oxidation reactor, a preliminary shutdown and alarm are triggered, and the failure of the effluent to enter is measured by a flowmeter (13) located immediately before the economizer (4). If the effluent flow goes below a setpoint, determined by one half the volume of the main oxidation reactor, the plant goes to the pre-shutdown or preliminary shutdown mode. The effluent impulsion pumps (2, 3) have a nominal flow equal to two times the volume of the main oxidation reactor (12), thus preventing the reaction time from decreasing excessively. There is a safety system inside the main oxidation reactor (12) by means of which a pressure above 3.5 Kg/cm$^2$ results in the opening of a safety valve (12.5) or rupture disc installed for that purpose.

The temperature conditions in the main oxidation reactor (12) are in the 110° C.-120° C. range and the pressures conditions are in the 1 Kg/cm$^2$-1.5 Kg/cm$^2$ range.

The formulation of the catalyst includes the following compounds: iron II, at a concentration of 2%-30% in the form of ferrous sulfate or ferrous chloride; copper II, at a concentration of 1%-10%, in the form of copper sulfate; organic acid, selected from among tartaric acid, oxalic acid, or citric acid, at a concentration of 1%-10%; iron complexing agent, such as EDTA and/or HDPE, at a concentration of 1%-5%; phosphoric acid, hydrochloric acid, or sulfuric acid to adjust the pH to a 1-2 range. This catalyst is dosed at a concentration of 0.01%-1% of the total flow to be treated.

The reaction temperature in the main oxidation reactor (12) is maintained by means of a duplicate check by PT-100 probes.

Once the effluent is treated in the main oxidation reactor (12) and cooled in the economizer (4) to 45° C. it is conveyed to the neutralization tank (6). In this tank the pH is increased above 7 by the addition of NaOH or another alkalizing agent, thus causing the precipitation of metallic hydroxides. In the neutralization tank (6) there is a pH controller (6.2), which ensures that the pH is in the 7-9 range, and a level controller (6.3).

At the neutralization tank outlets, pumps (6.4) send the water to the filter (7) or subsequent decanter.

Normal Installation Shutdown.

The purpose of this stage is to shut down the installation safely and without producing untreated water. The shutdown of the plant is an automated procedure. The control system performs the following actions: closes the $H_2O_2$ flow valve (8.3) and [stops] the $H_2O_2$ dosing pump (8.2), stops the catalyst dosing pump (11.3), cancels the interlocks that lead to emergency pre-shutdown, deactivates the heating interlock, opens the nitrogen or vapor purge automatic inerting valve (12.8).

A timer (effluent recirculation initiation time) is started, and once the established time has elapsed the control system diverts the effluent to the homogenization tank (1).

When the temperature inside the main oxidation reactor (12) is less than 60° C., the following actions are triggered: the reactor exhaust valve (12.7) is opened 100%; the effluent pump (2 and 3) stops; the reactor agitator (12.2) stops; the reactor level controller (12.3) is deactivated, which leaves the valve (12.7) in the manual-open position; the reactor pressure controller (12.6) is deactivated, which leaves the safety valve (12.5) in the manual-open position; the reactor exhaust valves (12.5, 12.7, 12.9) remain in the safe (open) position; the inerting valve (12.8) is closed automatically.

The safety checks are carried out automatically.

In the method all of the variables that affect safety are measured continuously and involve pre-shutdown or emergency shutdown alarms.

Emergency Pre-shutdown.

The purpose of this stage is to shut down the installation safely if an abnormal operating situation that might cause a major risk occurs.

There is a series of signals that are not considered to be of immediate risk and that can be solved in a short period of time, signals that trigger preliminary shutdown or emergency shutdown.

These are:

Temperature below 100° C. (below 100° C. the reaction slows down), the oxygenated water is not reacting, with the risk of accumulation and violent decomposition that this entails.

The pH of the effluents is outside the range. Below a pH of 2 the reaction slows. At high pHs, above 5, there is a risk of precipitation of metallic hydroxides, inhibiting the oxidation reaction. Another control parameter that triggers an alarm is a measurement difference between 2 pH meters of 0.3 units. Since the residence time of the effluents in the reactors is 60 minutes, an immediate adjustment of the pH of the effluents is not essential. For this reason, a deviation in the tolerable pH values has no immediate action except after a time defined by a series of timers. When the pH is out of range, high or low, the Preliminary Shutdown alarm is not activated until an [established] period of time has elapsed. The purpose of these timers it to provide a cushion for a pH point fluctuation.

High $H_2O_2$ concentration. This poses a risk of feeding oxygenated water with a high concentration, with the possibility of generating explosive mixtures inside the reactors. The maximum allowable concentration of hydrogen peroxide is 35%. A second check of the oxygenated water is by means of the $H_2O_2$ dosing pump (8.2), which cannot release a flow greater than 10% of the discharge flow. $H_2O_2$ dosing is also controlled with a control valve (8.3) and an anti-return valve.

High or low reactor levels.

Low effluent flow. Treating a low volume of effluents can be ineffective. The flowmeter (13) located before the economizer (4) measures effluent flow. If it is less than one half the volume of the reactor or there is no flow, a preliminary shutdown occurs.

A low effluent:$H_2O_2$ ratio would require excessive feeding of oxygenated water, with the risk of formation of explosive mixtures. If this is the case, the effluents must be diluted to a greater degree.

Low agitation in the homogenization tank (1), neutralization tank (6), and the reactor (12). The agitators must always remain in strong agitation [mode], which prevents the separation of the phases that might produce explosive mixtures by the combination of organic matter and oxygenated water.

Low catalyst flow. Absence of catalyst prevents the reaction. If the catalyst dosing is interrupted, the emergency pre-shutdown alarm is activated.

These signals cause an "Emergency Pre-Shutdown." This is the cutoff of $H_2O_2$ feeding by closing a valve (8.3), cutoff of catalyst feeding by closing a valve (11.6), starting a timer, sounding of the alarm, and opening the inerting valve (12.8), and if this does not correct the anomaly within a predetermined time, the "Emergency Shutdown" action occurs.

Emergency Shutdown.

The "Emergency Shutdown" involves the control system switching to "Safe Position" all valves (8.3, 11.6, 12.8, 12.5, 12.7, 12.9), pumps (2, 3, 8.2, 9.2, 10.2, 11.3, 6.4), and agitators (1.1, 12.2, 6.1). All of these actions are aimed at discharging [the contents of] the main oxidation reactor (12) into the homogenization tank (1) by means of a rapid discharge valve (12.7) provided for this purpose, at the same time as all effluent feeding and reagent dosing are halted and inerting with water vapor or nitrogen is activated.

An "Emergency Shutdown" is prompted not only due to an anomaly that involves a Pre-shutdown that is not solved within a given time, 600 seconds, but also because the temperature of the main oxidation reactor (12) exceeds a setpoint value, 125° C. This high temperature in the reactors may accelerate the reaction and become uncontrollable again, with the risks that this entails, because the pressure in the main oxidation reactor (12) exceeds a setpoint value, 1.5 $Kg/cm^2$. An excessive pressure may be an indication of a sudden decomposition that the system provided for this purpose cannot stop, or because a push-button provided for this purpose is manually activated, or the Emergency Shutdown is activated through a control system.

There is a safety system inside the main oxidation reactor (12) by means of which a pressure greater than 3.5 $Kg/cm^2$ results in the opening of a safety valve (12.5) or rupture disc installed for this purpose.

Variations in materials, shape, size, and arrangement of the component elements, described in a non-limiting manner, do not alter the essentialness of this invention, this being sufficient for it to be reproduced by an expert.

The invention claimed is:

1. A method of oxidizing organic contaminants in wastewater by means of the Fenton reaction characterized in that such reaction takes place at an absolute pressure of between 1 $Kg/cm^2$ and 1.5 $Kg/cm^2$ and at a temperature of between 110° C. and 120° C.

2. The method of claim 1 wherein such reaction takes place at 115° C.

3. The method of claim 1 wherein such reaction takes place at a pH of between 1 and 2.

4. The method of claim 1 wherein the catalyst employed in the Fenton reaction is comprised of a metal salt, an organic acid and a complexing agent.

5. The method of claim 4 wherein the metal salt is selected from the group consisting of ferrous sulfate, ferrous chloride and copper sulfate.

6. The method of claim 4 wherein the organic acid is selected from the group consisting of tartaric acid, oxalic acid and citric acid.

7. The method of claim 4 wherein the complexing agent is selected from the group consisting of EDTA and HDPE.

8. A method of oxidizing organic contaminants in wastewater by means of the Fenton reaction characterized in that (a) such reaction takes place at an absolute pressure of between 1 $Kg/cm^2$ and 1.5 $Kg/cm^2$ and at a temperature of between 110° C. and 120°C.; and (b) the catalyst employed in such reaction consists of (i) one or more iron salts, (ii) optionally an organic acid, and (iii) optionally an iron complexing agent.

9. The method of claim 8 wherein such reaction takes place at 115° C.

10. The method of claim 8 wherein such reaction takes place at a pH of between 1 and 2.

11. The method of claim 8 wherein the catalyst employed in the Fenton reaction consists of an iron salt, an organic acid and an iron complexing agent.

12. The method of claim 11 wherein the metal salt is selected from the group consisting of ferrous sulfate and ferrous chloride.

13. The method of claim 11 wherein the organic acid is selected from the group consisting of tartaric acid, oxalic acid and citric acid.

14. The method of claim 11 wherein the complexing agent is selected from the group consisting of EDTA and HDPE.

\* \* \* \* \*